(12) United States Patent
Kim et al.

(10) Patent No.: US 8,767,620 B2
(45) Date of Patent: Jul. 1, 2014

(54) METHOD AND APPARATUS FOR MANAGING DEVICE DISCOVERY IN WIRELESS SYSTEM

(75) Inventors: Yong Sun Kim, Daejeon (KR); Seung Eun Hong, Daejeon (KR); Hyoung Jin Kwon, Daejeon (KR); Kyeong Pyo Kim, Daejeon (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 272 days.

(21) Appl. No.: 13/120,155

(22) PCT Filed: Sep. 21, 2009

(86) PCT No.: PCT/KR2009/005361
§ 371 (c)(1),
(2), (4) Date: Mar. 21, 2011

(87) PCT Pub. No.: WO2010/033000
PCT Pub. Date: Mar. 25, 2010

(65) Prior Publication Data
US 2011/0170573 A1 Jul. 14, 2011

(30) Foreign Application Priority Data

Sep. 22, 2008 (KE) .................. 10-2008-0092902
Sep. 14, 2009 (KR) .................. 10-2009-0086268

(51) Int. Cl.
*H04W 4/00* (2009.01)
*H04W 40/24* (2009.01)
*H04W 8/00* (2009.01)

(52) U.S. Cl.
CPC ............ *H04W 40/244* (2013.01); *H04W 8/005* (2013.01)
USPC ............................. 370/328; 370/400; 455/446

(58) Field of Classification Search
None
See application file for complete search history.

(56) References Cited

U.S. PATENT DOCUMENTS

| | | | |
|---|---|---|---|
| 7,949,358 B2 * | 5/2011 | Wentink et al. | 455/515 |
| 2003/0016732 A1 * | 1/2003 | Miklos et al. | 375/132 |
| 2006/0089964 A1 * | 4/2006 | Pandey et al. | 709/203 |
| 2007/0286136 A1 | 12/2007 | Rittle et al. | |
| 2008/0019287 A1 * | 1/2008 | Hong | 370/254 |
| 2008/0031208 A1 * | 2/2008 | Abhishek et al. | 370/338 |
| 2008/0031210 A1 * | 2/2008 | Abhishek et al. | 370/338 |
| 2008/0086560 A1 * | 4/2008 | Monier et al. | 709/224 |
| 2008/0089390 A1 * | 4/2008 | Picard | 375/132 |
| 2010/0061271 A1 * | 3/2010 | Seyedi-Esfahani et al. | 370/254 |
| 2011/0013611 A1 * | 1/2011 | Chou et al. | 370/338 |

FOREIGN PATENT DOCUMENTS

| | | |
|---|---|---|
| KR | 10-2005-0118711 A | 12/2005 |
| WO | WO-2007/082036 A1 | 7/2007 |
| WO | WO-2008/088190 A1 | 7/2008 |

* cited by examiner

*Primary Examiner* — Bob Phunkulh
(74) *Attorney, Agent, or Firm* — Rabin & Berdo, P.C.

(57) ABSTRACT

Provided is a method and apparatus for managing a device discovery in a wireless system. The device discovery management method may include: transmitting, by a discovery device, a discovery beacon that contains information associated with a discovery scanning duration; and receiving, from a neighboring device, a response message to the discovery beacon in the discovery scanning duration.

18 Claims, 7 Drawing Sheets

METHOD AND APPARATUS FOR MANAGING DEVICE DISCOVERY IN WIRELESS SYSTEM

TECHNICAL FIELD

The present invention relates to a wireless system enabling a high data rate transmission using an ultra-wideband high frequency signal with a strong straightness, and more particularly, to a method and apparatus for managing a device discovery in a wireless system enabling a high data rate transmission.

BACKGROUND ART

In a wireless system enabling a high data rate transmission, a device may be classified into any one of three types. For example, a type A device may support antenna training and a communication distance thereof is about 10 meters. A type B device may not support antenna training, and a communication distance thereof is about five meters. A type C device may support only a master-slave operation and a communication distance thereof is about 2 meters. Here, the term "device" denotes a communication device that may transmit data at a high data rate.

In the wireless system enabling a high data rate transmission, when a power is applied, a device may initially verify which neighboring devices exist in a current network. The device may perform a device discovery procedure to perform antenna training with a neighboring device, as necessary.

Hereinafter, the device discovery procedure is referred to as a discovery procedure. The device performing the discovery procedure is referred to as a discovery device.

To search for neighboring devices, the discovery device may transmit, via a discovery channel, a beacon where a status field is set to a discovery. Hereinafter, the beacon where the status field is set to the discovery is referred to as a "discovery beacon" or a "Poll frame".

Also, to search for different types of devices, the discovery device may transmit a beacon using a physical (PHY) mode supported by a desired type device. Here, the beacon using the PHY mode supported by the desired type device is referred to as the "Poll frame".

When performing the discovery procedure, each of devices may divide a space into sectors, and perform the discovery procedure with devices included in the sectors. In this instance, to perform the discovery procedure with the devices of the sectors, the discovery device may transmit the beacon or the poll frame using a directional beam. For a response to the beacon or the poll frame, the devices may also transmit a response message to a corresponding sector using the directional beam. Hereinafter, the device receiving the beacon or the poll frame from the discovery device is referred to as a neighboring device. The neighboring device may also perform discovery scanning for each sector according to an antenna performance.

Accordingly, there is a need for a method and apparatus that enables a device to effectively perform a discovery procedure, and enables each of a type A device, a type B device, and a type C device to accurately perform discovery scanning for each sector in a wireless system enabling a high data rate transmission.

DISCLOSURE OF INVENTION

Technical Problem

An aspect of the present invention provides a method and apparatus for managing a device discovery that enables a device to effectively perform a discovery procedure, and enables each of a type A device, a type B device, and a type C device to accurately perform discovery scanning for each sector.

Another aspect of the present invention also provides a method and apparatus for managing a device discovery that may minimize a response message collision caused by a hidden device.

Another aspect of the present invention also provides a method and apparatus for managing a device discovery that may solve a problem that a discovery device or a neighboring device iteratively transmits and receives a response message with respect to a discovery beacon.

Another aspect of the present invention also provides a method and apparatus for managing a device discovery that enables each of a type A device, a type B device, and a type C device to accurately perform discovery scanning for each sector when a transmission opportunity is obtained through a contention.

Solution to Problem

According to an aspect of the present invention, there is provided a method of managing a device discovery, the method including: transmitting, by a discovery device, a discovery beacon that contains information associated with a discovery scanning duration; and receiving, from a neighboring device, a response message to the discovery beacon in the discovery scanning duration.

The response message may include status information indicating that the response message is a response to the discovery beacon.

The discovery beacon may include device control information, and the device control information may include a Status field indicating that the discovery beacon is used to search for neighboring devices.

The device control information may further include a Security Mode field indicating a security mode where the discovery device is currently set, a Signaling Slot field indicating whether the discovery beacon is transmitted in a signaling beacon slot, and a Movable field indicating whether the discovery beacon is movable according to a beacon period (BP) contraction.

The response message may include device control information, and the status information may be included in the device control information.

A backoff timer in the discovery scanning duration may be a maximum length of a frame of the response message.

A transmission opportunity for the discovery device may be allocated based on a sector unit of the discovery device. The transmission opportunity may include a D0 Discovery duration for discovery of a first device supporting antenna training, a B0 Poll duration for discovery of a second device, a C0 Poll duration for discovery of a third device, a C-SCAN duration, a B-SCAN duration, and a D-SCAN duration.

According to another aspect of the present invention, there is provided a communication apparatus including: a discovery beacon generator to generate a discovery beacon containing information associated with a discovery scanning duration; a transmitter to transmit the discovery beacon to a neighboring device; and a receiver to receive, from the neighboring device, a response message to the discovery beacon in the discovery scanning duration.

Advantageous Effects of Invention

According to embodiments of the present invention, it is possible to manage a device discovery so that a device may effectively perform a discovery procedure, and each of a type A device, a type B device, and a type C device may accurately perform discovery scanning for each sector.

Also, according to embodiments of the present invention, it is possible to minimize a response message collision caused by a hidden device.

Also, according to embodiments of the present invention, it is possible to solve a problem that a discovery device or a neighboring device iteratively transmits and receives a response message with respect to a discovery beacon.

MODE FOR THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described in detail with reference to the accompanying drawings. When it is determined detailed description related to a known function or configuration they may render the purpose of the present invention unnecessarily ambiguous in describing the present invention, the detailed description will be omitted herein.

Figure 1:
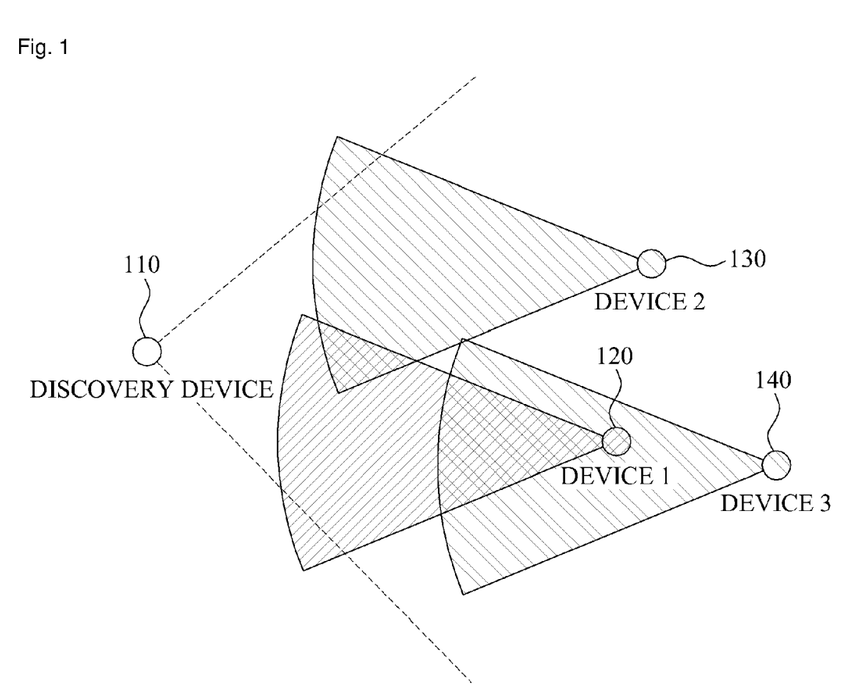
FIG. 1 is a diagram for describing a discovery procedure according to an embodiment of the present invention.

FIG. 1 is a diagram for describing a discovery procedure according to an embodiment of the present invention. In FIG. 1, a direction indicated by a dotted line indicates a single sector covered by a discovery device 110.

Here, the discovery device 110 corresponds to a type A device. Therefore, the discovery device 110 may support antenna training. The discovery procedure and the antenna training process may be performed using a discovery channel. Here, antenna training indicates a process of adjusting an antenna parameter and the like to maximize a link performance between devices. Generally, a device performing antenna training may select a pattern or steer a transmit and receive beam pattern through the above antenna training process.

Neighboring devices, that is, a first device 120, a second device 130, and a third device 140 may be classified into any one of the type A device, a type B device, and a type C device.

To perform the discovery procedure, the discovery device 110 may transmit Discovery Beacon BlockS (DBBS). The DBBS may include Mode-D0 Discovery Beacon, Mode-B0 Poll, and Mode-C0 Poll. After transmitting the DBBS, the discovery device 110 may be waiting during a C-SCN duration, a B-SCAN duration, and a Mode D0-SCAN duration to receive a response from type C devices, type B devices, and type A devices, respectively. When the discovery device 110 includes a plurality of antennas, the above DBBS transmission and response reception process may be repeated the same number of times as the number of antennas. The discovery device 110 may receive the responses in the above scan durations, and thereby become aware that corresponding devices exist.

To prevent a collision with other devices, the discovery device 110 may need to obtain a transmission opportunity (TXOP) corresponding to a DBBS interval. To obtain the TXOP, the discovery device 110 may employ a Distributed Contention Access (DCA) scheme. Accordingly, the discovery device 110 may obtain the TXOP using the DCA scheme in a channel. The DCA scheme denotes a scheme that may perform a transmission when a backoff counter is zero and the channel is in an idle status. The DCA scheme and the TXOP obtainment scheme may be variously specified according to a communication standard or a communication scheme.

Constituent elements of the DBBS may be separated by a period of time equal to a Beacon Interframe Space (BIFS). A Mode-D0 Discovery Beacon corresponds to a beacon to search for type A devices. A "Discovery Scanning Information Element (IE)" contained in the Mode-D0 Discovery Beacon may include a point in time when the type A devices receiving the beacon starts a response, and a period of time used by the response. Specifically, the type A devices receiving the Mode-D0 Discovery Beacon may transmit a response beacon using the DCA scheme within a starting point in time and an end point in time of the Mode-D0 Scan duration.

The type B devices receiving a Mode-B0 Poll frame may transmit a response frame within a corresponding duration from a point in time indicated by "Discovery Scanning IE" included in the Mode-B0 Poll frame.

However, a Mode-C0 Poll frame is not included in "Discovery Scanning IE". The type C devices may receive the Mode-C0 Poll frame and then transmit a response message immediately after a Short Interframe Space (SIFS).

Figure 2:
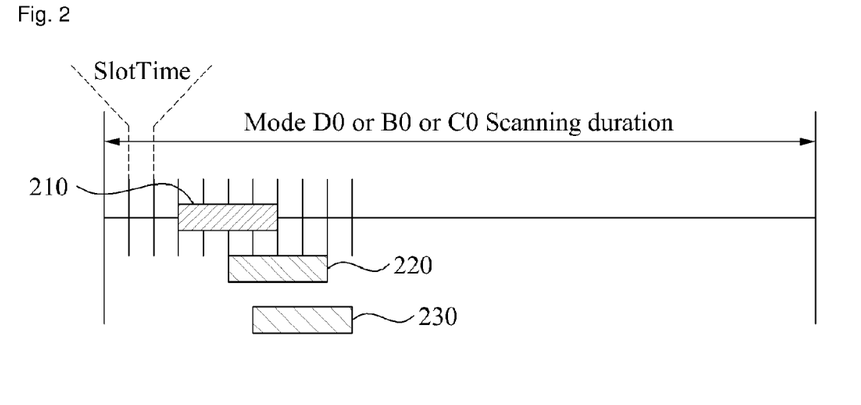
FIG. 2 is a diagram illustrating an example of performing backoff by each of devices of FIG. 1.

FIG. 2 is a diagram illustrating an example of performing backoff by each of the first device 120, the second device 130, and the third device 140 of FIG. 1.

FIG. 2 illustrates an example where devices perform backoff based on a SlotTime unit. The first device 120 may preoccupy a channel and transmit a response message 210 in a scanning duration. The second device 130 and the third device 140 may not recognize the response message 210 and thus may transmit response messages 220 and 230, respectively. Accordingly, while receiving the response message 210 from the first device 120, the discovery device 110 may receive the response messages 220 and 230 from the second device 130 and the third device 140, which may result in a collision. In this instance, the second device 130 and the third device 140 may need to recognize that the first device 120 pre-occupies the channel, based on a Clear Channel Assessment (CCA). However, due to a limitation on a directional beam, the second device 130 and the third device 140 may not recognize that the channel is preoccupied by the first device 120, whereby the collision may occur.

Figure 3:
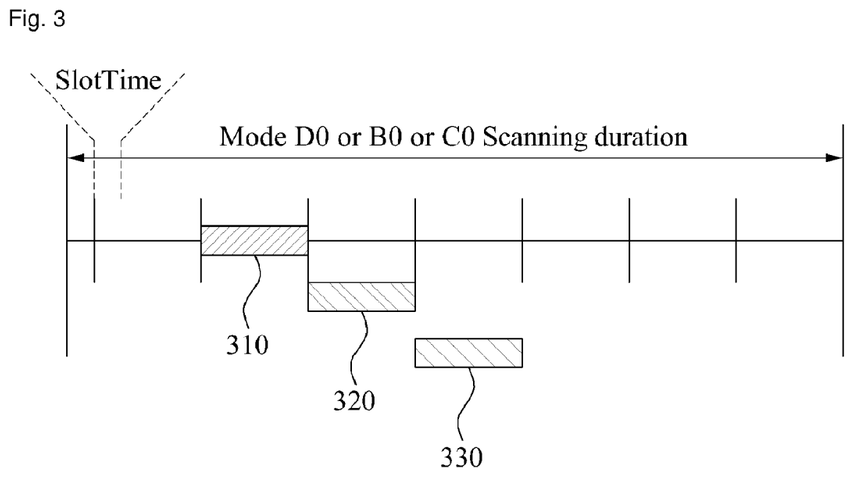
FIG. 3 is a diagram illustrating another example of performing backoff by each of the devices of FIG. 1.

FIG. 3 is a diagram illustrating another example of performing backoff by each of the first device 120, the second device 130, and the third device 140 of FIG. 1. Specifically, a backoff counter is a maximum length of a response message frame.

The first device 120 may pre-occupy a channel in a scanning duration and transmit a response message 310 in a scanning duration. A response message 320 of the second device 130 may be transmitted after the transmission of the response message 310 is completed. A response message 330 of the third device 140 may be transmitted after the transmission of the response message 320 is completed.

Accordingly, when the backoff counter is set to be the maximum length of the response message frame, a response message collision may not occur.

According to an embodiment of the present invention, the backoff counter may be set to be an average length of the response messages 310, 320, and 330. Also, the backoff counter may be set to a size that a plurality of response messages occupies, whereby it is possible to minimize a collision caused by a hidden device.

Also, according to an embodiment of the present invention, a device receiving a discovery beacon may set a response message backoff value differently depending on a received strength of the discovery beacon. Through this, it is possible to reduce a collision probability caused by the hidden device. Specifically, a backoff timer may be set differently depending on the received strength of the discovery beacon.

Figure 4:
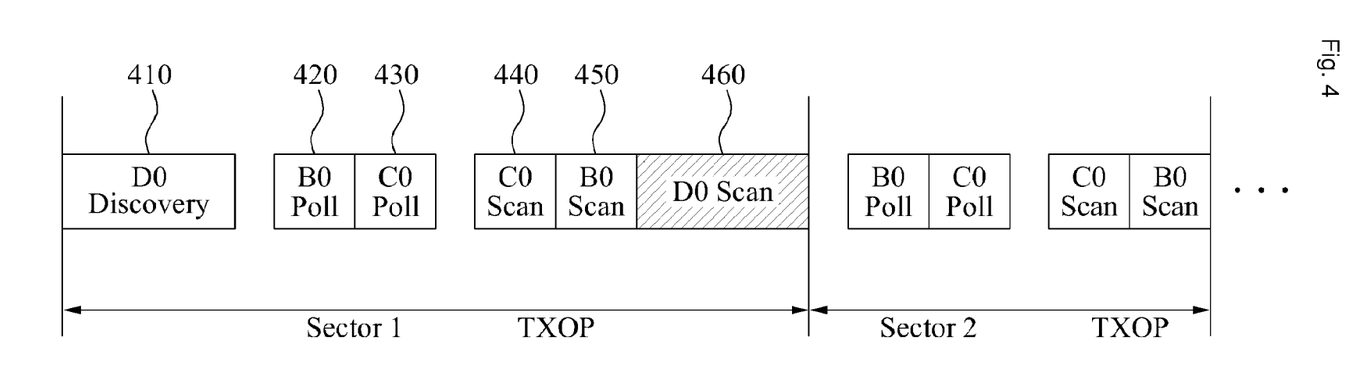
FIG. 4 is a diagram illustrating an example of managing a discovery duration according to an embodiment of the present invention.

FIG. 4 is a diagram illustrating an example of managing a discovery duration according to an embodiment of the present invention.

Referring to FIG. 4, DBBS for a sector 1 may include a D0 Discovery duration 410, a B0 Poll duration 420, a C0 Poll duration 430, a C0 Scan duration 440, a B0 Scan duration 450, and a D0 Scan duration 460. A TXOP for a discovery device may be allocated based on a sector unit of the discovery device. Accordingly, the D0 Discovery duration 410, the B0 Poll duration 420, the C0 Poll duration 430, the C0 Scan duration 440, the B0 Scan duration 450, and the D0 Scan duration 460 may be included in a single TXOP.

The D0 Discovery duration 410 corresponds to a duration for transmitting a "D0 Discovery Beacon" for discovery of a type A device. Therefore, in the D0 Discovery duration 410, the discovery device may transmit the D0 Discovery Beacon. In the D0 Scan duration 460, the type A device receiving the D0 Discovery Beacon may transmit a response message thereto to the discovery device. The D0 Discovery duration 410 may be set to be sufficiently longer than the B0 Poll duration 420 and the C0 Poll duration 430 in order to expand a discovery coverage of the discovery device.

Due to a DCA scheme, a duration of the DBBS for the sector 1 may be variable. Accordingly, when the D0 duration 460 is not positioned within the DBBS for the sector 1, scanning durations may become inaccurate due to the DCA scheme.

In FIG. 4, the D0 Scan duration 460 is followed by the B0 Scan duration 450, and is included in the single TXOP together with the C0 Scan duration 440 and the B0 Scan duration 450. Accordingly, it is possible to solve the above inaccuracy problem caused by the DCA scheme.

Figure 5:
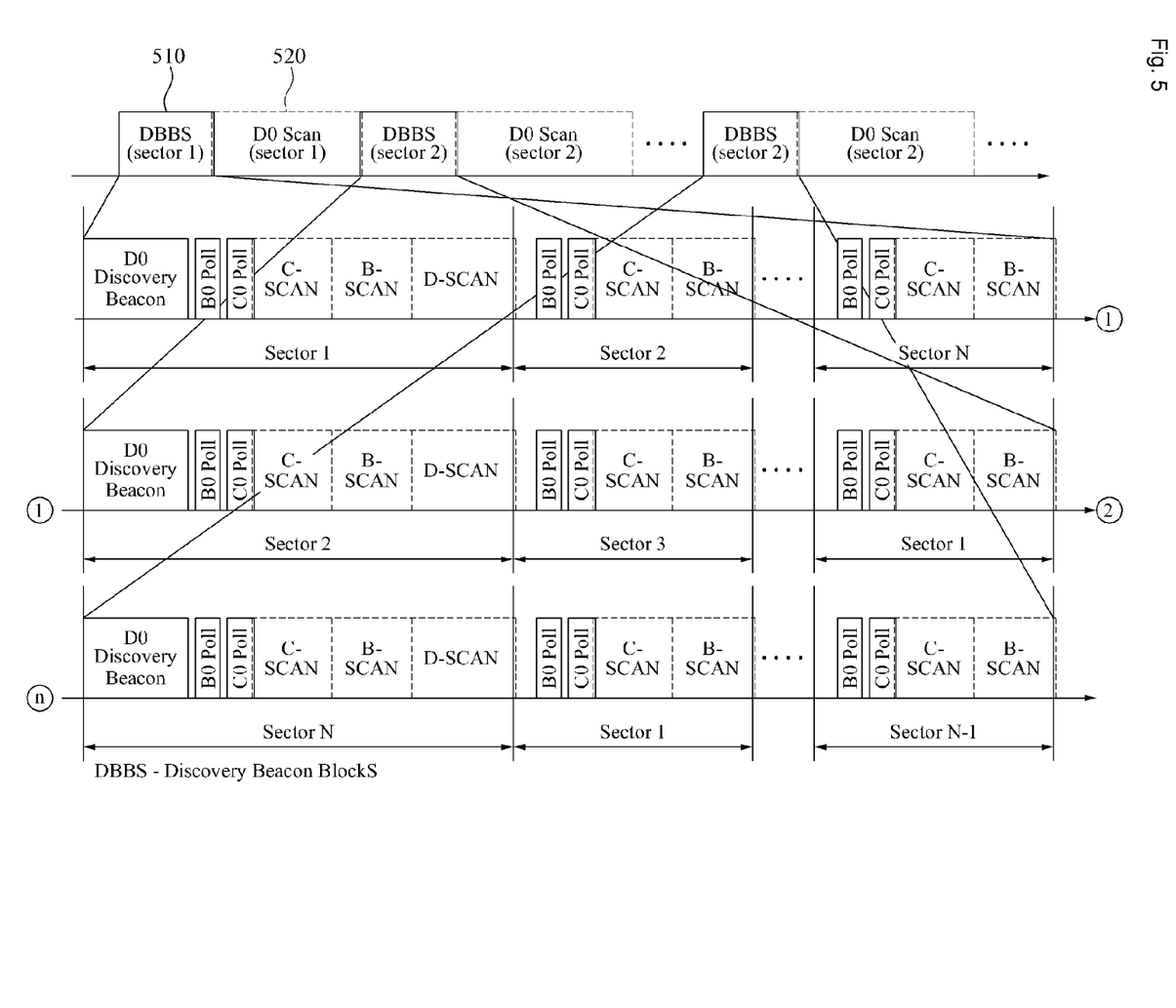
FIG. 5 is a diagram illustrating a configuration of Discovery Beacon BlockS (DBBS) according to an embodiment of the present invention.

FIG. 5 is a diagram illustrating a configuration of DBBS according to an embodiment of the present invention.

In a case where a discovery device includes a plurality of antennas and performs a discovery procedure for a plurality of sectors, the example of FIG. 5 may be applicable. Here, the discovery device may be a type A device.

Referring to FIG. 5, a DBBS 510 for a sector 1 may have a configuration as shown in FIG. 4. Therefore, a D-SCAN duration is simply followed by a B-SCAN duration and is included in a single TXOP together with a C-SCAN duration and the B-SCAN duration. A D0 Scan duration 520 may be followed by the DBBS 510. Like the D-SCAN duration, the D0 Scan duration 520 corresponds to a duration where type A devices transmit a response message corresponding to a discovery beacon.

Figure 6:
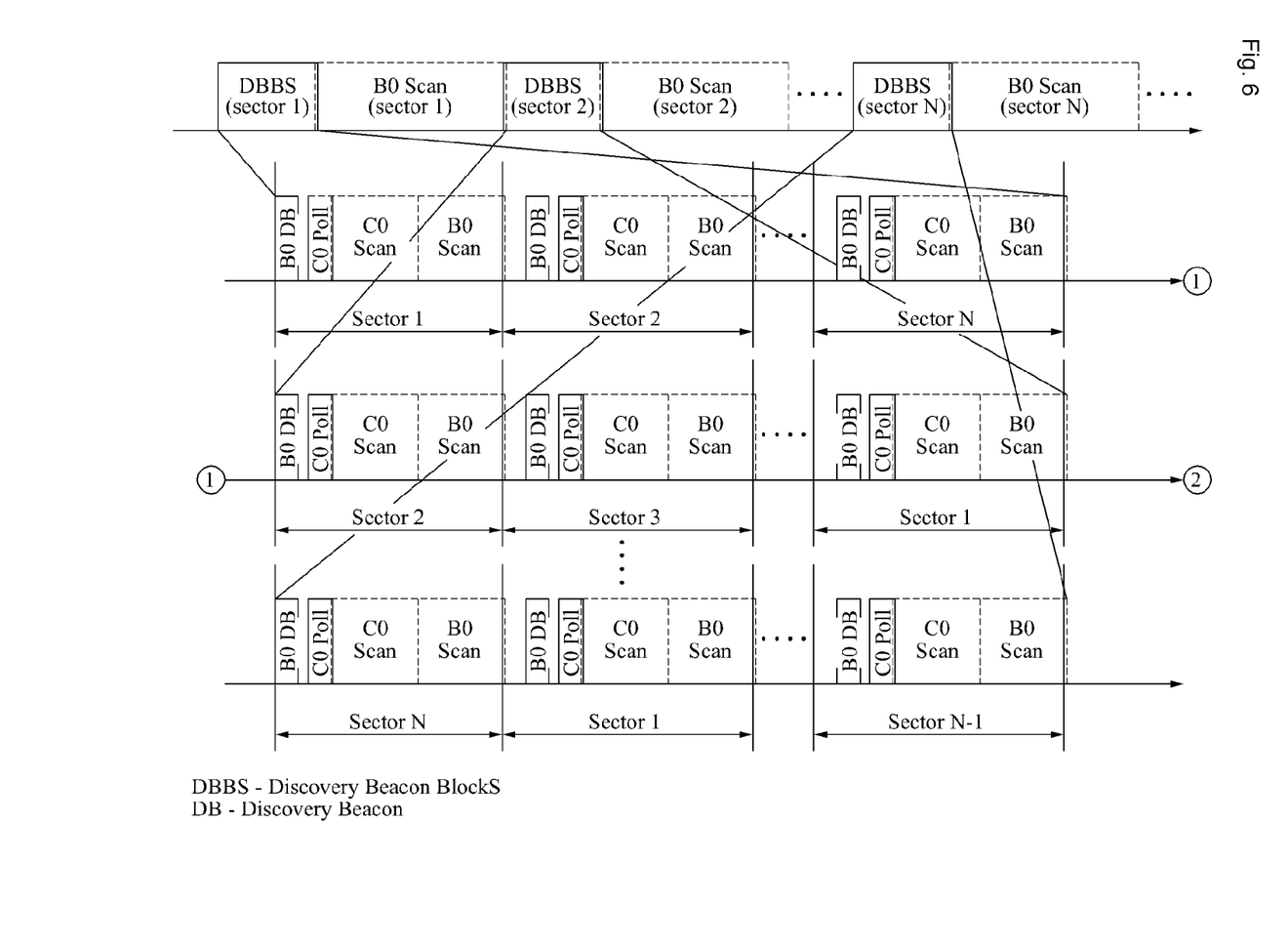
FIG. 6 is a diagram illustrating a configuration of DBBS according to another embodiment of the present invention.

FIG. 6 is a diagram illustrating a configuration of DBBS according to another embodiment of the present invention.

The DBBS of FIG. 6 may be performed by a type B device. Here, the type B device does not perform a discovery for a type A device in a discovery procedure.

Figure 7:
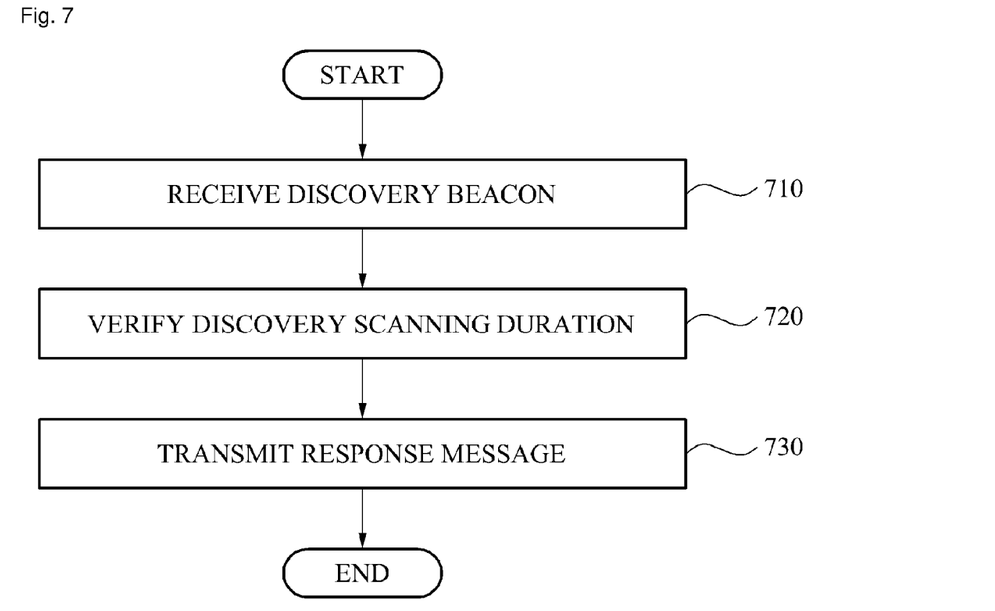
FIG. 7 is a flowchart illustrating a method of managing a device discovery according to an embodiment of the present invention.

FIG. 7 is a flowchart illustrating a method of managing a device discovery according to an embodiment of the present invention.

The device discovery management method of FIG. 7 may be performed by any one of a type A device, a type B device, and a type C device. Also, the device discovery management method may be performed using the examples of FIGS. 4 through 6.

In operation 710, a device may receive a discovery beacon from a discovery device. Specifically, a discovery device may transmit the discovery beacon containing information associated with a discovery scanning duration. For example, the discovery beacon may be D0 Discovery Beacon of FIG. 5. Also, the discovery beacon may be B0 Poll or C0 Poll.

In operation 720, the device may verify the discovery scanning duration from the discovery beacon. Here, the discovery beacon may include a "Discovery Scanning IE. The "Discovery Scanning IE" may contain scanning duration information for each device type. Therefore, the device may verify the discovery scanning duration from the discovery beacon.

In operation 730, the device may transmit, to the discovery device, a response message to the discovery beacon in the discovery scanning duration. Specifically, the discovery device may receive, from a neighboring device, the response message to the discovery beacon in the discovering scanning duration. Here, a backoff timer in the discovery scanning duration may be set to a maximum length of a frame of the response message.

The response message may include status information indicating that the response message is a response to the discovery beacon. When the response message does not include the status information, the discovery device receiving the response message may retransmit the response message. In this case, it is possible to prevent the discovery device from retransmitting the response message by including a device identifier (ID) in the response message, and by unicasting or broadcasting the response message.

Figure 8:
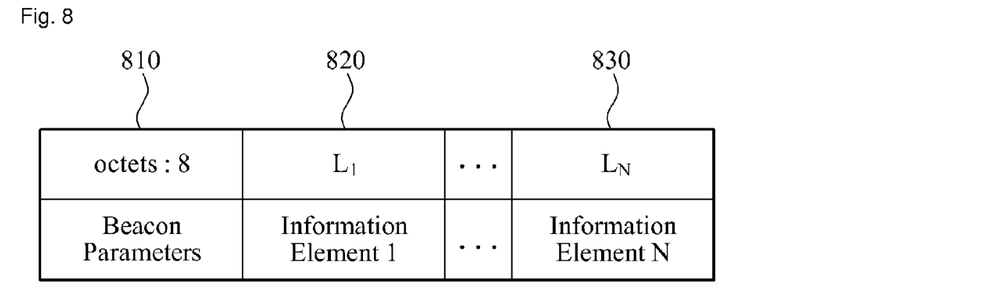
FIG. 8 is an example of a beacon frame format according to an embodiment of the present invention.

FIG. 8 is an example of a beacon frame format according to an embodiment of the present invention.

The beacon frame format of FIG. 8 indicates a format of a body excluding a header of a beacon frame. The beacon frame format may be applicable to a format of a discovery beacon or a format of the response message to the discovery beacon.

Referring to FIG. 8, the beacon frame may include a Beacon Parameter field 810 and a plurality of Information Element fields 820 and 830.

Figure 9:
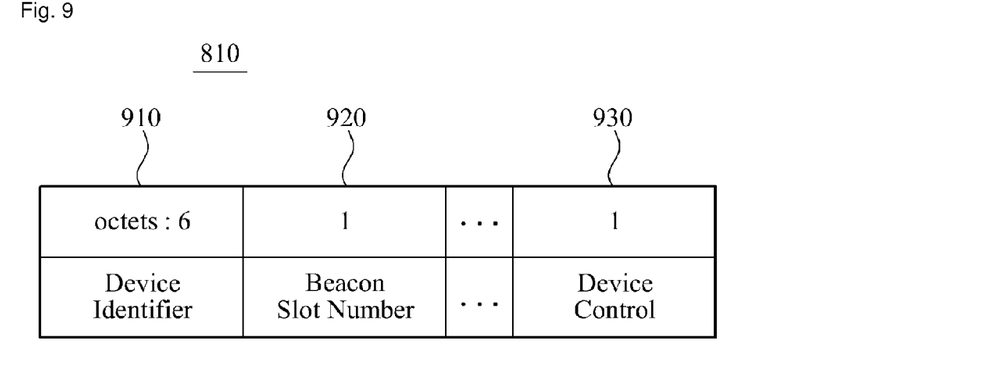
FIG. 9 is a diagram illustrating a configuration of a Beacon Parameters field of FIG. 8.

The Beacon Parameter field 810 may be constructed as shown in FIG. 9.

The Information Element fields 820 and 830 may include various types of information elements associated with a channel selection. For example, the Information Element fields 820 and 830 may include a scan timing information element regarding when each device performs scanning, and when each device returns to a discovery channel to perform a scan response, and the like.

FIG. 9 is a diagram illustrating a configuration of the Beacon Parameter field 810 of FIG. 8.

A Device Identifier field 910 may be set according to EUI-48 of a device transmitting a beacon.

A Beacon Slot Number field 920 may be set to a number of a beacon slot where the beacon is transmitted within a beacon period (BP), excluding beacons transmitted in signaling slots.

A Device Control field 930 may include device control information. Here, the device control information may include a Status field indicating that the discovery beacon is used to search for neighboring devices.

Figure 10:
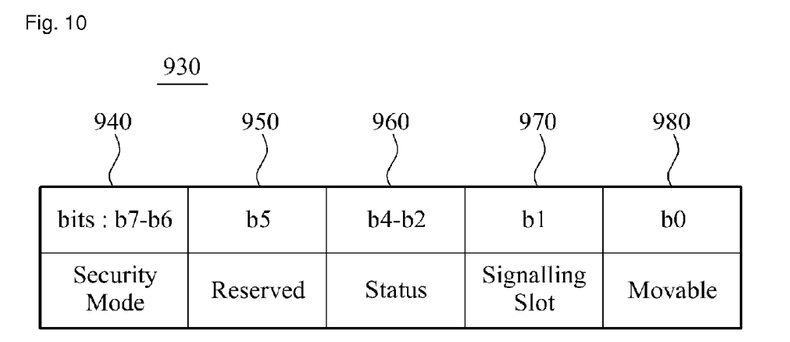
FIG. 10 is a diagram illustrating a configuration of a Device Control field of FIG. 9.

FIG. 10 is a diagram illustrating a configuration of the Device Control field 930 of FIG. 9.

A Security Mode field 940 may be set to a security mode where a device is currently set.

A Reserved field 950 indicates a field reserved for future use.

A Status field 960 may be constructed as given by the following Table 1:

TABLE 1

| Value | Meaning |
|---|---|
| 0 | Ready |
| 1 | Discovery |
| 2 | Response |
| 3 | Preemptive |
| 4 | Dual |

In the case of a discovery beacon, the Status field 960 may indicate that a discovery beacon is used to search for neighboring devices. In the case of a response message, the Status field 960 may include status information indicating that the response message is a response to the discovery beacon. Therefore, the response message may include device control information. The status information may be included in the device control information.

In the above Table 1, "Ready" denotes a status value set in a beacon transmitted in a superframe when a device communicates with a responder device after completing a discovery procedure. "Discovery" denotes a beacon used to search for neighboring devices in a discovery channel. "Response" denotes a beacon informing other devices about its own existence in response to the discovery beacon received from the neighboring devices when searching for the neighboring devices in the discovery channel. Here, when receiving the discovery beacon, a reception device may perform a data communication by transmitting an antenna training frame or a channel selection request frame instead of transmitting the response frame. "Preemptive" may be used to request devices, currently in communication, to move from the discovery channel to another channel. "Dual" may be used to prevent a collision with a type A device when a type B device performs the data communication.

A Signaling Slot field 970 may indicate whether the discovery beacon is transmitted in signaling beacon slots.

A Movable field 980 may indicate whether the discovery beacon is movable according to a BP contraction.

Figure 11:
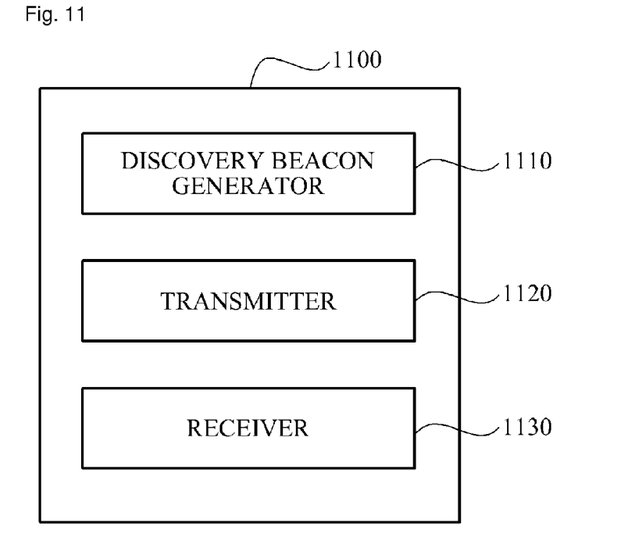
FIG. 11 is a block diagram illustrating a configuration of a communication apparatus according to an embodiment of the present invention.

FIG. 11 is a block diagram illustrating a configuration of a communication apparatus 1100 according to an embodiment of the present invention.

The communication apparatus 1100 may perform a device discovery management method according to an embodiment of the present invention. The communication apparatus 1100 may include a discovery beacon generator 1110, a transmitter 1120, and a receiver 1130. The communication apparatus 1100 may further include a configuration to generate or process data, a processor to perform a control operation, and the like. For ease of description, a configuration included in a general communication apparatus is not described here.

The discovery beacon generator 1110 may generate a discovery beacon. The discovery beacon may contain information associated with a discovery scanning duration.

The transmitter 1120 may transmit the discovery beacon to a neighboring device.

The receiver 1130 may receive, from the neighboring device, a response message to the discovery beacon in the discovery scanning duration. Here, the response message may include status information indicating that the response message is a response to the discovery beacon.

Figure 12:
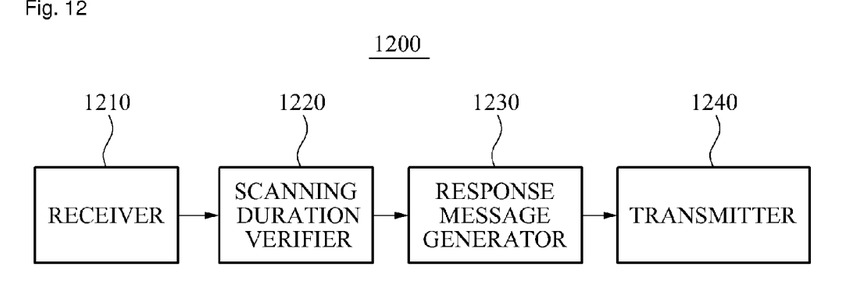
FIG. 12 is a block diagram illustrating a configuration of a communication apparatus according to another embodiment of the present invention.

FIG. 12 is a block diagram illustrating a configuration of a communication apparatus 1200 according to another embodiment of the present invention.

The communication apparatus 1200 may perform a device discovery management method according to an embodiment of the present invention. The communication apparatus 1200 may include a receiver 1210, a scanning duration verifier 1220, a response message generator 1230, and a transmitter 1240. The communication apparatus 1200 may further include a configuration to generate or process data, a processor to perform a control operation, and the like. For ease of description, a configuration included in a general communication apparatus is not described here.

The receiver 1210 may receive a discovery beacon for a device discovery.

The scanning duration verifier 1220 may verify a discovery scanning duration to respond to the discovery device.

The response message generator 1230 may generate a response message to the discovery beacon.

The transmitter 1240 may transmit the response message to the discovery device in the discovery scanning duration.

The exemplary embodiments of the present invention include computer-readable media including program instructions to implement various operations embodied by a computer. The media may also include, alone or in combination with the program instructions, data files, data structures, tables, and the like.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of managing a device discovery, the method comprising:
    transmitting, at the discovery device, a discovery beacon to a neighboring device, the discovery beacon containing information of a discovery scanning duration in which the neighboring device is to respond; and
    receiving, at the discovery device, a response message from the neighboring device that receives the discovery beacon within the discovery scanning duration included in the discovery beacon, wherein the information of the discovery scanning duration includes scan timing information for discovery of the neighboring device according to a device type of the neighboring device.

2. The method of claim 1, wherein:
the discovery beacon includes device control information, and
the device control information includes a Status field indicating that the discovery beacon is used to search for neighboring devices.

3. The method of claim 2, wherein the device control information further includes a Security Mode field indicating a security mode where the discovery device is currently set, a Signaling Slot field indicating whether the discovery beacon is transmitted in a signaling beacon slot, and a Movable field indicating whether the discovery beacon is movable according to a beacon period (BP) contraction.

4. The method of claim 1, wherein:
the response message includes device control information, and
the status information is included in the device control information.

5. The method of claim 1, wherein a backoff timer in the discovery scanning duration is a maximum length of a frame of the response message.

6. The method of claim 1, wherein:
a transmission opportunity for the discovery device is allocated based on a sector unit of the discovery device, and
the transmission opportunity includes a D0 Discovery duration for discovery of a first device supporting antenna training, a B0 Poll duration for discovery of a second device, a C0 Poll duration for discovery of a third device, a C-SCAN duration, a B-SCAN duration, and a D-SCAN duration.

7. The method of claim 1, wherein a backoff timer in the discovery scanning duration is set to be different depending on a received strength of the discovery beacon.

8. The method of claim 1, wherein the response message includes status information indicating that the response message is a response to the discovery beacon.

9. The method of claim 1, wherein
the device type is one of type A, type B and type C, and
a device of type B supports a longer communication distance than a device of type C, but supports a shorter communication distance than a device of type A.

10. A communication apparatus comprising:
a discovery beacon generator configured to generate a discovery beacon containing information of a discovery scanning duration in which a neighboring device receiving the discovery beacon is to respond;
a transmitter configured to transmit the discovery beacon to the neighboring device; and
a receiver configured to receive, from the neighboring device that receives the transmitted discovery beacon, a response message within the discovery scanning duration included in the discovery beacon,
wherein the information of the discovery scanning duration includes scan timing information for discovery of the neighboring device according to a device type of the neighboring device.

11. The communication apparatus of claim 10, wherein:
the discovery beacon includes device control information, and
the device control information includes a Status field indicating that the discovery beacon is used to search for neighboring devices.

12. The communication apparatus of claim 11, wherein the device control information further includes a Security Mode field indicating a security mode where a discovery device is currently set, a Signaling Slot field indicating whether the discovery beacon is transmitted in a signaling beacon slot, and a Movable field indicating whether the discovery beacon is movable according to a BP contraction.

13. The communication apparatus of claim 10, wherein:
the response message includes device control information, and
the status information is included in the device control information.

14. The communication apparatus of claim 10, wherein a backoff timer in the discovery scanning duration is a maximum length of a frame of the response message.

15. The communication apparatus of claim 10, wherein:
a transmission opportunity for the communication apparatus is allocated based on a sector unit corresponding to a coverage of a discovery device, and
the transmission opportunity includes a D0 Discovery duration for discovery of a first device supporting antenna training, a B0 Poll duration for discovery of a second device, a C0 Poll duration for discovery of a third device, a C-SCAN duration, a B-SCAN duration, and a D-SCAN duration.

16. The communication apparatus of claim 10, wherein a backoff timer in the discovery scanning duration is set to be different depending on a received strength of the discovery beacon.

17. The communication apparatus of claim 10, wherein the response message includes status information indicating that the response message is a response to the discovery beacon.

18. The communication apparatus of claim 10, wherein
the device type is one of type A, type B and type C, and
a device of type B supports a longer communication distance than a device of type C, but supports a shorter communication distance than a device of type A.

* * * * *